United States Patent Office 3,353,043
Patented Nov. 14, 1967

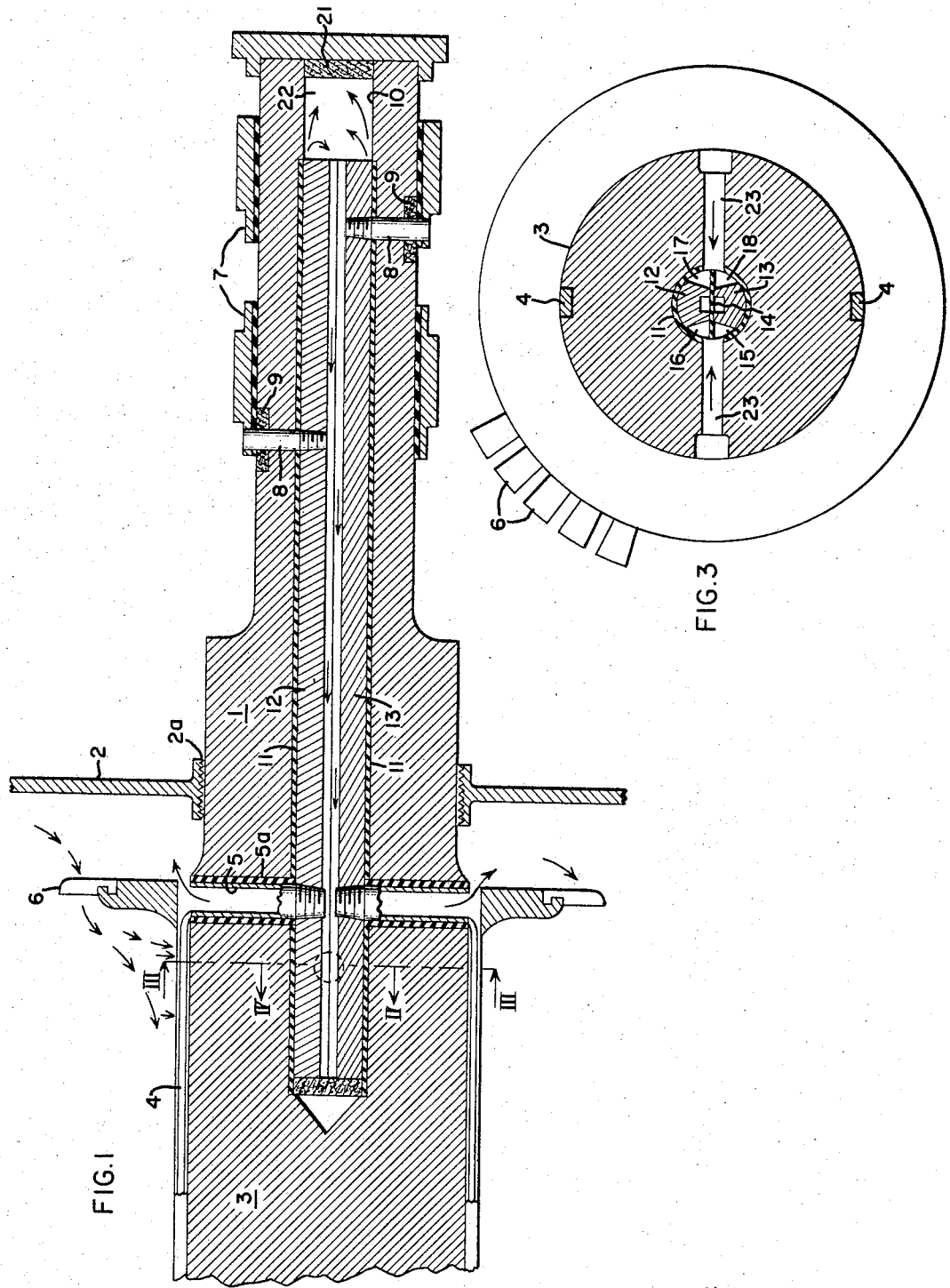

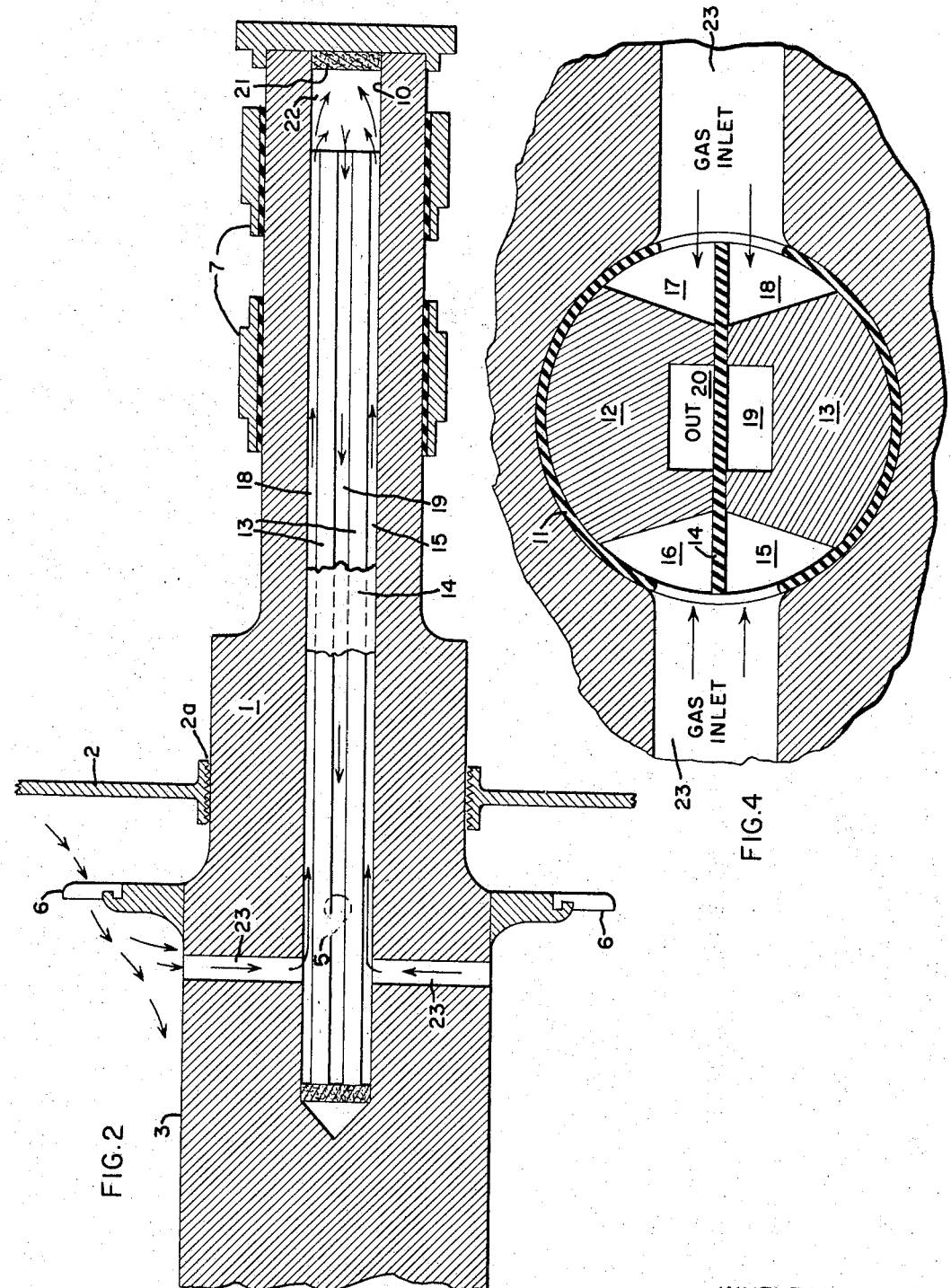

3,353,043
CONDUCTOR COOLING SYSTEM FOR DYNAMO-ELECTRIC MACHINE ROTOR
Donald R. Albright, Scotia, N.Y., assignor to General Electric Company, a corporation of New York
Filed May 14, 1965, Ser. No. 455,710
5 Claims. (Cl. 310—61)

ABSTRACT OF THE DISCLOSURE

Conductor-cooled dynamoelectric machine connection bars.

---

This invention relates to a cooling system for conductors in a dynamoelectric machine rotor and more particularly to an improved gas flow system in the rotor of a generator for cooling the connection bars between the slip rings and the rotor field windings.

There is a continuing trend in the power generation industry towards generators of increased capacity. However, because of considerations of strength of rotor materials and of transportation problems, the physical size of these machines cannot be conveniently increased in proportion to their increased ratings. It has thus been necessary to increase the current loading on the generator conductors. This has given rise to an added burden of heat removal from the conductors inside of the generator casings. The advent of the conductor-cooled generator winding, in which coolant gas, such as hydrogen, or liquid, such as water, is passed along the conductor or in close proximity thereto, has been a significant development in remedying this problem and permitting larger output generators to be made without increasing their physical sizes. In the case of the rotor in particular, increased current in its conductors means increased current through the connection bars. Connection bars are the conductors electrically connecting the slip or collector rings, which are outside the generator casing, to the rotor field windings, which are inside. Since the connection bars extend from within to without the generator casing, their cooling by the conductor-cooled method is attended by the problem of keeping the coolant fluid within the generator casing or, at any rate, within a closed system so as not to leak out.

Patent No. 3,043,901 to Gerwing et al., discloses one type of connection bars and means by which they are conductor-cooled, including a pair of axially extending conductors within a central bore in the rotor shaft, the conductors separated by insulation, and axially extending passages for the flow of coolant fluid along the conductors.

In Gerwing et al., the flow of coolant fluid is motivated by locating its intake at a smaller radius than its discharge. Thus the rotor shaft, with fluid intake at a point of relatively small radius and fluid discharge at a point of greater radius, acts as a centrifugal blower or pump. The provision of the necessary difference in radius between intake and discharge has been found to be incompatible with other design considerations in some cases. Also, the aforesaid Gerwing arrangement requires feeding the gas axially along the borehole to the intake passages rather than from a location radially outward of the borehole.

Accordingly, it is an object of this invention to provide an improved cooling arrangement for the connection bars which conduct current from the collector rings to the field windings of a generator rotor.

Another object is to provide a connection bar which is conductor-cooled by means independent of the relative radii of points of intake and discharge of coolant fluid.

These and other objects, advantages and features of this invention will become apparent from the following description when considered in connection with the accompanying drawings.

Briefly stated, this invention comprises a cylindrical bore along the central axis of a generator rotor, the bore containing connection bars, the bars insulated from one another and from the rotor bore, axial passages along the connection bars, a sealed chamber connecting the axial passages at the outer end of the shaft, one or more radial passages from the high pressure side of the generator fan to the connection bars for coolant flow, and one or more radial passages from the connection bars to the low pressure or suction side of the generator fan for return flow. The radial passages are preferably also employed to contain radial conductors for electrically connecting the connection bars to the rotor winding.

In the drawing:

FIG. 1 is a longitudinal section of the end of a generator rotor,

FIG. 2 is a longitudinal section similar to FIG. 1, rotated 90°,

FIG. 3 is a cross sectional view taken along the line III—III of FIG. 1, and

FIG. 4 is an enlarged cross sectional view taken along the line IV—IV of FIG. 1.

Referring now to FIG. 1, a generator rotor shaft portion 1 is shown extending through a substantially gas-tight casing 2. Gas is prevented from escaping casing 2 by means such as a seal shown at 2a. A slotted rotor core 3 contains axially extending main lead 4 connected at one end to the rotor field windings (not shown) and at the other end to hollow or tubular radial conductors 5. Conductors 5 are insulated from rotor shaft 1 by insulating tubes 5a and communicate at the outer ends with the low pressure side of a shaft-mounted fan 6. Cooling fan 6 circulates coolant fluid, generally hydrogen, within the casing in the direction of the arrows. Outside of the generator casing 2, a source of excitation current (not shown) supplies current to slip rings or collector rings 7. Collector rings 7 are electrically connected to radial conductors 8 which are sealed as at 9 to prevent coolant fluid leakage therearound. Collector rings 7 supply current to main lead 4 by means of conductors 8 and 5 which are electrically connected as follows. An axial bore 10 is formed along the center of rotor shaft 1 and extends along the rotor shaft beyond radial conductors 5 as shown.

As shown in FIG. 4, bore 10 contains a tube 11 of insulating material which in turn contains a pair of conductors or connection bars 12 and 13 which are preferably bare conductors and are separated from each other by an insulation strip 14 extending diametrically across tube 11. Connection bars 12 and 13 in cross section are partly circular so as to fit against the wall of cylinder 11, leaving passages 15, 16, 17, 18, 19 and 20. Passages 15, 16, 17 and 18 serve two purposes. First, they are a preventive measure against electrical creepage which would otherwise occur at the interfaces between insulation strip 14 and insulation tube 11 if there were no space gap. Second, and more importantly, they are used as conduits for coolant flow in one direction. Passages 19 and 20 are used as conduits for coolant flow in the opposite direction. A fluid seal 21 is put on the end of rotor shaft 1 spaced from connection bars 12 and 13 so as to form a chamber 22.

Referring now to FIG. 2, radial inlet passages 23 spaced 90° from the radial conductors 5 are made to communicate with the interior of the generator casing at the high pressure side of fan 6 and with passages 15, 16, 17, and 18.

The operation of the structure just described is as follows: When the generator is running, the coolant fluid contained in its casing, such as hydrogen, is circulated from fan 6 and enters radial inlet passages 23 as shown in FIG. 2. It flows through passages 15, 16, 17 and 18 to chamber 22 and then through return passages 19 and 20, through radial hollow conductors 5 and out to the suction side of fan 6.

Thus it will be apparent that the coolant fluid is entirely and simply contained within a closed system while at the same time effectively cooling the connection bars extending outside of the generator casing. Furthermore, it will be apparent that the disclosed connection bar is conductor-cooled by means which are independent of diameter sizes and proportions.

It will occur to others of ordinary skill in the art to make modifications of this invention which will remain within the concept and scope thereof and will not constitute patentable departure therefrom. For example, hollow radial conductors 5 could be made the inlet passages by opening them to the fan pressure side and passages 23 could be the return passages by opening them to the suction side of the fan 6. Other combinations of passages and other flow circuits within this concept are intended and the foregoing are used as examples only.

Accordingly, it is intended that the invention be not limited by the details in which it has been described but that it encompass all modifications within the purview of the following claims.

What is claimed is:

1. A dynamoelectric machine comprising a rotor member having a shaft portion, a sealed casing surrounding said rotor member and through which one end of said shaft portion projects, and a fan means mounted on said rotor within said casing, said shaft portion having a central axial cylindrical bore, a plurality of connection bars longitudinally disposed within said axial bore, insulation separating said connection bars from each other and from the wall of said axial bore, said connection bars and said insulation defining longitudinal passages along said axial bore, and a seal on said one end of said shaft portion closing off the bore to define a chamber common to all of said longitudinal passages, such dynamoelectric machine characterized by the following improvement comprising:
a plurality of radial passages defined by the part of said shaft portion inside said casing, each of said radial passages permitting communication between the interior of said casing and one of said longitudinal passages,
at least one of said radial passages communicating with said interior on the suction side of said fan means,
at least one of said radial passages communicating with said interior on the discharge side of said fan means.

2. A dynamoelectric machine according to claim 1 in which there are two of said connection bars and said insulation comprises a cylindrical tube and a longitudinal strip extending diametrically across the inside thereof.

3. A dynamoelectric machine according to claim 1 wherein at least two hollow radial conductors are disposed in as many of said radial passages to conduct coolant fluid therethrough, said conductors being insulated from said shaft and being electrically connected to alternate connection bars.

4. A dynamoelectric machine comprising a rotor member having a shaft portion, a sealed casing surrounding said rotor member and through which one end of said shaft portion projects, said shaft portion having a central axial cylindrical bore, the part of said shaft portion inside said casing having a plurality of radial bores communicating with said axial bore, a fan within said casing, at least one of said radial bores communicating with the interior of said casing on the suction side of said fan, at least one of said radial bores communicating with the interior of said casing on the pressure side of said fan, a plurality of connection bars longitudinally disposed within said axial bore, insulation separating said connection bars from each other and from the wall of said axial bore, said connection bars and said insulation defining longitudinal passages along said axial bore, said passages communicating by said radial bores alternatively with said suction side of said fan and with said pressure side of said fan, said connection bars individually connected by hollow radial conductors disposed through said radial bores to windings on said rotor, a plurality of collector rings on the portion of said shaft extending outside of said casing, a plurality of radial bores in the portion of said shaft extending outside said casing, said last named radial bores communicating with said axial bore, said connection bars individually connected through said last named radial bores to said collector rings, and a seal on said one end of said shaft portion closing off the bore to define a chamber common to all of said longitudinal passages.

5. A dynamoelectric machine according to claim 4 in which there are two of said connection bars and said collector rings, and said insulation comprises a cylindrical tube and a longitudinal strip extending diametrically across the inside thereof.

References Cited

UNITED STATES PATENTS

| | | | |
|---|---|---|---|
| 2,286,871 | 6/1942 | Mortensen | 310—262 |
| 2,798,977 | 7/1957 | Henter | 310—232 |
| 2,950,403 | 8/1960 | Kilner et al. | 310—61 |
| 3,043,901 | 7/1962 | Gerwing et al. | 310—61 |
| 3,145,314 | 8/1964 | Becker | 310—61 |

MILTON O. HIRSHFIELD, *Primary Examiner.*

L. L. SMITH, *Assistant Examiner.*